United States Patent

[11] 3,617,551

| [72] | Inventors | Walker F. Johnston<br>Flossmoor, Ill.;<br>Robert G. Will, Munster, Ind. |
|---|---|---|
| [21] | Appl. No. | 20,509 |
| [22] | Filed | Mar. 18, 1970 |
| [45] | Patented | Nov. 2, 1971 |
| [73] | Assignee | Standard Oil Company<br>Chicago, Ill. |

[54] APPARATUS AND PROCESS FOR PURIFYING OIL-CONTAMINATED WATER
3 Claims, 2 Drawing Figs.

[52] U.S. Cl. .................................................. 210/23,
210/40, 210/136, 210/350, 210/DIG. 21, 210/30
[51] Int. Cl. .................................................... B01d 23/24,
B01d 29/14
[50] Field of Search ............................................. 210/24, 30,
39, 40, 350, 351, 496, DIG. 21, 23

[56]      References Cited
         UNITED STATES PATENTS

| 3,131,040 | 4/1964 | Dunn et al. ................ | 210/351 X |
| 3,334,042 | 8/1967 | Teitsma ..................... | 210/40 X |

FOREIGN PATENTS

| 462,499 | 3/1937 | Great Britain ................ | 210/351 |
| 632,698 | 7/1936 | Germany ...................... | 210/351 |

Primary Examiner—Samih N. Zaharna
Attorneys—Arthur G. Gilkes, William T. McClain and John J. Connors ABSTRACT: Disclosed is a "cartridge-type" apparatus useful for purifying oil-contaminated water. This apparatus includes a flow-through chamber containing polyurethane foam and a pistonlike member which responds to hydraulic pressure to squeeze the foam. As oil-contaminated water flows through the chamber, oil is absorbed by the foam. Periodically, a hydraulic pressure head is established within the chamber which forces the pistonlike member to compress the foam and squeeze the oil therefrom.

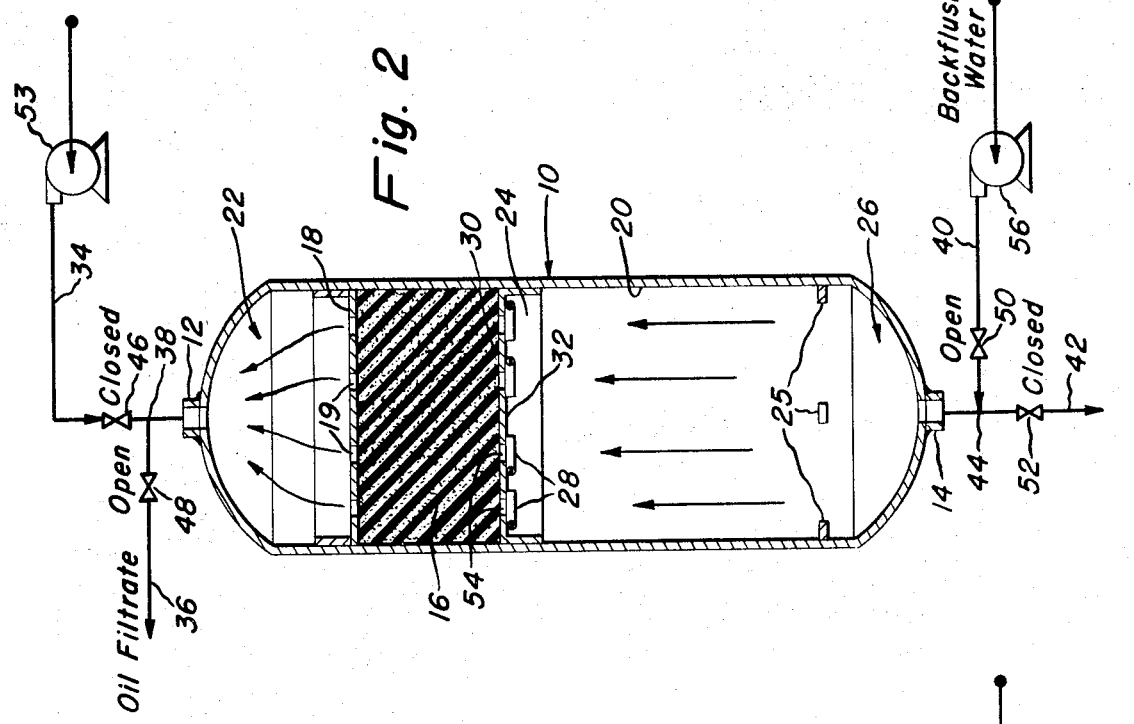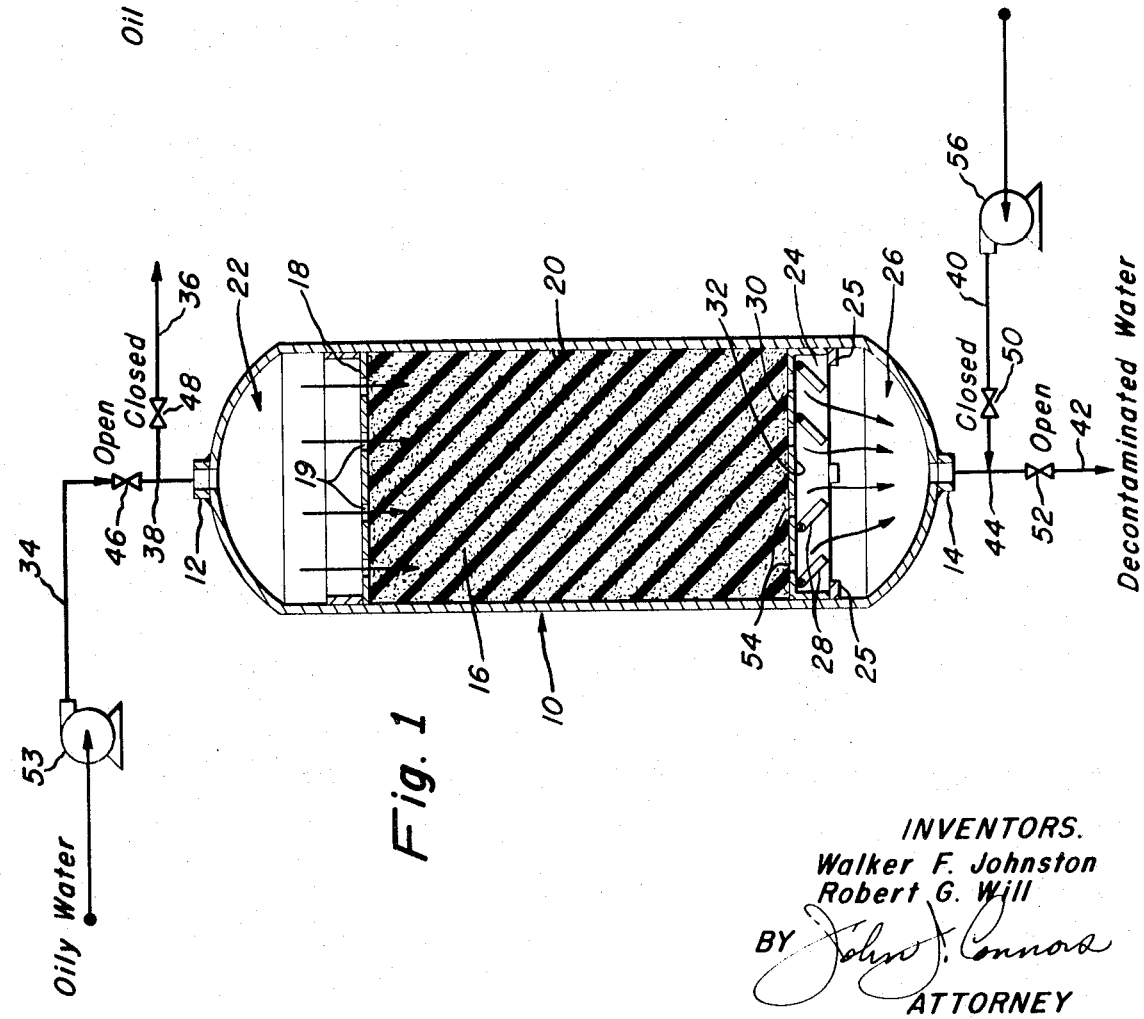

3,617,551

APPARATUS AND PROCESS FOR PURIFYING OIL-CONTAMINATED WATER

BACKGROUND

In U.S. Pat. No. 3,487,927, Robert L. Yahnke has disclosed oil and water separation equipment which relies on filtration principles. This unique piece of equipment uses, as the filtration medium, a foamed polyurethane belt trained about a perforated drum rotatably mounted in a water holding tank into which oil-contaminated water is pumped. A differential in pressure is established across the belt and the contaminated water flows through the belt, with the oil being absorbed by the belt. Absorbed oil is subsequently removed from the belt and collected.

THE INVENTION

We have now invented a simplified "cartridge-type" filtering apparatus which eliminates the need for revolving foamed polyurethane belts or drums. Our improved apparatus includes chamber means having a pair of spaced port means, and disposed between these port means, a regenerable porous filter material, such as foamed polyurethane, which is capable of selectively absorbing oil. Oil-contaminated water simply flows through the chamber means, being introduced through one port means, then percolating through the filter material, and finally issuing from the other port means in a highly purified state. Regeneration of the filter material is accomplished by establishing hydraulic pressure within the chamber means to squeeze absorbed oil from the filter material. Preferably, piston means within the chamber means carries out the squeezing operation. This piston means is disposed between the filter material and one of the port means and it may include check valve means which permits water to flow from the filter material but prevents water from flowing into the filter material.

DESCRIPTION OF DRAWINGS

FIG. 1 is a schematic partial cross-sectional view of our apparatus showing oil-contaminated water flowing through the chamber means.

FIG. 2 is a schematic partial cross-sectional view of our apparatus showing the piston means squeezing oil from the filter material.

PREFERRED EMBODIMENT

As depicted in FIGS. 1 and 2, our apparatus includes vertical chamber 10 having at its opposite ends piping connections or port means 12 and 14. The cross section of chamber 10 is preferably circular, although other geometric shapes would be suitable. Chamber 10 may be fitted with flanges, removable heads, or other means of access so that it can be filled with a cartridge of polyurethane foam 16. Plate 18 attached to sidewall 20 of chamber 10 at upper end 22 abuts foam 16. This plate 18 may be a screen, wirecloth, perforated plate, etc., so that water can flow freely through the plate and into foam 16. The openings 19 in plate 18 can be constructed so that large particles would be prevented from entering foam 16.

Pistonlike member 24, at lower end 26 of chamber 10 between foam 16 and port means 14, furnishes the means for squeezing absorbed oil from the foam. Member 24 is supported by a plurality of stops 25, and it preferably has one or more check valves 28. These check valves 28 are arranged so that they open when water presses against the side 30 of member 24 but are closed when water presses against opposite side 32 of member 24.

Port means 12 includes pipes 34 and 36 connected at T-joint 38, and port means 14 includes pipes 40 and 42 connected at T-joint 44. Valves 46 and 48 are disposed, respectively, in pipes 34 and 36, and valves 50 and 52 are disposed, respectively, in pipes 40 and 42. Three-way valves may, however, be used in place of two-way valves shown.

Pump 53 is used to pump oil-contaminated water through pipe 34 and open valve 46 into upper end 22 of chamber 10. As indicated in FIG. 1, this oil-contaminated water flows through port means 12 downwardly through the plate 18, foam 16, and openings 54 in pistonlike member 24. As the contaminated water flows through foam 16, oil is absorbed in the pore structure of the foam. Purified water thus leaves port means 14 via pipe 42 and open valve 52.

Regeneration of foam 16 is depicted in FIG. 2 where water, either purified or unpurified, is pumped into chamber 10 by pump 56. During regeneration, valves 48 and 50 are open and valves 46 and 52 are closed. Water, under pressure, flows through pipe 40 and open valve 50, through port means 14 into chamber 10. This establishes within end 26 of chamber 10 hydraulic pressure which closes check valves 28. Water pressure builds up and presses against side 32 of member 24, pushing member 24 toward port means 12. Foam 16 is thus squeezed between pistonlike member 24 and plate 18, and the oil entrapped therein is squeezed from the foam. This liberated oil flows through port means 12, out pipe 36 and open valve 48 into a suitable storage tank. The liberated oil, as it is squeezed from foam 16, also backwashes plate 18, removing any contaminants trapped thereat.

The flow rate during filtration and the amount of hydraulic pressure needed to regenerate the foam will depend upon the size of chamber 10. These parameters can be easily determined. The time for regeneration can be determined on the basis of maximum pressure drop across the polyurethane foam during filtration. Sampling the water periodically would also be a means for determining when regeneration was necessary. Upper end 22 of chamber 10 should be designed to hold the minimum amount of oil so that very little oil would be contained at this end after regeneration. After regeneration, valves 46 and 52 are opened and valves 48 and 50 are closed. With the valves in these positions, filtering operations are renewed. Flow of oil-contaminated water through filter 16 causes the resilient, flexible polyurethane foam to readjust itself to its original volume as depicted in FIG. 1.

Although the preferred embodiment of our invention is depicted in FIGS. 1 and 2, other embodiments could be devised. For example, instead of a single cartridge of polyurethane foam, several abutting layers of foam could be used with different layers having different pore sizes. In this instance, the larger pore sections would preferably be arranged so that oil-contaminated water would contact these large pore sections before it contacts the smaller pore sections. Thus viscous oil would be trapped first. This would minimize clogging of filter 16. Moreover, filtration could be conducted in positions other than the one exemplified. For example, horizontally or upside-down. Hence, flow does not necessarily have to be downward when filtering. Furthermore, piston member 24 could be loose-fitting, so that during regeneration, clean water would flow around it to some extent to assist in flushing out filter material 16 and upper end 22. Oil-contaminated water could be used to backflush filter material 16, followed by clean water, or clean water could be used exclusively. In the latter case, auxiliary check valves could be provided so that clean water would backflush through the foam and upper end 22 of chamber 10.

Alternate arrangements of member 24 are also possible. A more complicated alternate arrangement than check valve 28 could be used to move member 24 during regeneration. For example, member 24 can be connected to a shaft that passes through a packing box in chamber 10 and is connected to an external driving mechanism. In this alternate arrangement, member 24 would contain valves or openings that were mechanically closed during regeneration and open during filtration. A more simplified arrangement is also possible. This simplified arrangement would include all the parts depicted in FIGS. 1 and 2 except member 24 and its check valves 28. In place of member 24, an element similar to plate 18 would be used, however, this element would not be attached to sidewall 20 of chamber 10 and it would be movable like member 24.

Compression of the foam during regeneration would be accomplished by using a backflush flow rate substantially higher than the filtering rate. The pressure drop across foam 16 would then become great enough to compress the foam and squeeze the oil out.

We claim:

1. The apparatus for purifying oil-contaminated water, comprising:

chamber means having first and second spaced port means, and disposed between the port means, a regenerable porous filter material which selectively absorbs oil;

first means for introducing oil-contaminated water into the chamber via the first port means so that water flows through the filter material and out the second port means;

piston means within the chamber means which respond to hydraulic pressure established within the chamber means, said piston means being disposed between the filter material and the second port means and including means which permit water to flow from the filter material towards the second port means, but which prevent water from flowing from the second port means into the filter material; and second means for introducing water into the chamber via the second port means so that hydraulic pressure is established within the chamber which actuates the piston means to squeeze absorbed oil from the filter material, said oil flowing from the chamber means out the first port means.

2. A process for purifying oil-contaminated water, comprising the steps of:

passing said water in a first direction through a regenerable, porous filter material which selectively absorbs oil, said filter material being contained within a chamber having a first and second spaced port means, withdrawing the water flowing through the filter material at the first port means, periodically establishing a hydraulic pressure within the chamber means by passing water into the chamber means which flows generally in a direction opposite to said first direction, said hydraulic pressure squeezing absorbed oil from the filter material, and withdrawing from the chamber means oil squeezed from the filter material at the second port means.

3. The process of claim 2 wherein the filter material is polyurethane foam.

* * * * *